Patented Nov. 25, 1941

2,263,915

UNITED STATES PATENT OFFICE 2,263,915

POLYMERIZATION OF ROSIN AND ROSIN ESTERS

Joseph N. Borglin, Wilmington, Del., assignor to Hercules Powder Company, Wilmington, Del., a corporation of Delaware No Drawing. Application December 5, 1940, Serial No. 368,613

10 Claims. (Cl. 260—97)

This invention relates to the polymerization of rosin and rosin esters and more particularly to an improved process for polymerizing rosin and rosin esters.

Rosin and rosin esters have been heretofore polymerized with various polymerizing agents including metal halides such as stannic chloride, aluminum chloride and the like, but the results have not been entirely satisfactory. A major difficulty has been that of obtaining an intimate contact between the rosin or rosin ester and the metal chloride, by reason of the immiscibility of the metal chloride with, or insolubility in, the rosin or rosin ester or solution of rosin or rosin ester being treated. As a result, it is impossible to obtain the desired effectiveness of polymerization. In addition, when employing certain solvents, precipitation of a sludge of high polymer has frequently occurred, thereby rendering the recovery of the polymerized product more difficult.

This invention has as an object to devise a process for the polymerization of rosin or rosin esters with metal chlorides which overcomes to a large extent the difficulties with prior methods of polymerization. A further object is to increase the effectiveness of polymerization of rosin and rosin esters with metal chlorides. Other objects will appear hereinafter.

The objects of this invention in general are accomplished by dissolving a metal chloride in a solution of rosin or rosin ester in an organic solvent having the general formula

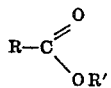

where R is an alkyl group of from 1 to 3 carbon atoms, and where R' is an alkyl group of from 1 to 8 carbon atoms, maintaining the solution of the rosin or rosin ester and the metal chloride under polymerizing conditions resulting in substantial polymerization of the rosin or rosin ester, and recovering polymerized rosin or polymerized rosin ester from the reaction mixture.

A preferred solvent is ethyl acetate. Less preferably, there may be employed lower alkyl esters of lower fatty acids such as the methyl, propyl, butyl, amyl, hexyl, heptyl, or octyl alcohol esters of acetic, propionic, and butyric and isobutyric acids. It is preferred to employ a solvent which has a boiling point sufficiently low that it may be removed from the solution of polymer without objectionable decomposition of the polymer.

In order to carry out the invention, wood rosin, gum rosin, or an ester thereof, and a chloride of a metal capable of forming an amphoteric hydroxide, are dissolved in the ester solvent, preferably ehtyl acetate, to form a solution containing from about 10% to about 70% of rosin or rosin ester by weight based on the combined weight of rosin or rosin ester and solvent and preferably from about 30% to about 40% by weight, the amount of catalyst employed falling within the range of from about 1% to about 50%, and preferably from about 5% to about 15% by weight based on the weight of rosin or rosin ester taken. This solution, which is preferably anhydrous, is maintained under substantially anhydrous conditions and under polymerizing conditions for a sufficient period of time to bring about the desired degree of polymerization of the rosin or rosin ester, the time of treatment varying from about 3 hours to about 150 hours, and preferably from about 10 hours to about 50 hours, the treatment being effected at a temperature falling within the range of from about —10° C. to about 150° C. and preferably from about 20° C. to about 80° C.

As the raw material, there may be used any form of rosin such as wood rosin, American gum rosin, French gum rosin, or equivalent materials such as abietic acid, pimaric acid, sapinic acid, etc. The rosin treated may be heat treated, isomerized, distilled, etc. It is preferred to use a rosin which has been previously refined for the removal of color bodies.

Examples of rosin esters which may be polymerized by the process of the present invention are polyhydric alcohol esters such as ester gum or esters with other polyhydric alcohols such as ethylene glycol, diethylene glycol, trimethylene glycol, butylene glycol, diglycerol, isobutyl glycerine (trimethylol methane), erythritol, pentaerythritol, adonitol, arabitol, xylitol, mannitol, sorbitol, dulcitol, inner ethers of the hexahydric alcohols such as sorbitan mannitan, sorbide, mannide, etc. Monohydric alcohol esters may be polymerized such as for example, esters with methyl, ethyl, propyl, butyl, amyl, octyl, cetyl, lauryl, stearyl, benzyl, abietyl, furfuryl, alcohols, etc. The esters of analogous rosin acids such as abietic, pimaric, and sapinic acid may be treated. It is preferred to treat a rosin ester which is substantially completely esterified, in order to minimize reaction between the metal chloride and the unpolymerized material or the polymer, which takes place to a considerable extent with free rosin. Thus it is preferred to treat a rosin ester having an acid number not over about 25. However, if desired, mixtures of rosin and rosin esters may be polymerized by the present invention.

The catalyst employed for carrying out the reaction may be any chloride of a metal which forms an amphoteric hydroxide. It is preferred to use the anhydrous metal chlorides and to carry out the reaction under substantially anhydrous conditions. It has been found that ethyl acetate and similar organic solvents exert a very high solvent action upon the anhydrous chlorides of amphoteric metals and upon complexes formed between such chlorides and the rosin or rosin ester undergoing polymerization. Thus, an intimacy of contact and effectiveness of polymerization not heretofore obtained with the metal chlorides are brought about. In addition, the precipitation of a sludge during the polymerization is inhibited, and in many cases avoided, since the reaction product exhibits good solubility in the ethyl acetate. Thus, recovery of the polymer is facilitated.

It is preferred to use such metal chlorides as aluminum chloride, or fuming stannic chloride. Instead of these chlorides, other amphoteric metal chlorides may be employed. Zinc chloride has only a very mild polymerizing effect. It is preferred to employ a chloride of a metal in its high valence, such as titanium tetrachloride, antimony pentachloride, stannic chloride, etc.

It is preferred to agitate the homogeneous solution throughout the treatment. This may be accomplished either by mechanical agitation or by bubbling an inert gas through the solution. The treatment may be effectively conducted by maintaining the solution at the refluxing temperature using a reflux condenser to return any volatilized ethyl acetate or the like. If desired, the reaction may be conducted at an elevated pressure ranging from 1 to 100 atmospheres, the use of such elevated pressures resulting in more rapid reaction and allowing the use of temperatures considerably above the refluxing temperature at atmospheric pressure. Use of such elevated pressures is advantageous in preventing the hydrochloric acid from escaping from the system, whereby the effectiveness of the reaction is increased by preventing combination of the metal of the chloride such as aluminum with carboxylic acid groups in the rosin or polymerized rosin.

Under some circumstances, it will be found convenient to introduce small amounts of gaseous HCl to the reaction mixture either before or during the reaction, thus activating the metal chloride catalyst.

The employment of an ester type solvent for the reaction mixture is advantageous since the carboxylic grouping

causes the solvent employed to exert a higher solvency upon the metal chloride and upon the combination of metal chloride with rosin, rosin ester, or "polymer." It is possible that this is due to the action of the carboxylic grouping

in forming a complex with the metal chloride.

The time required for the treatment will depend upon the concentration of the material to be polymerized in the solution, relative amounts of catalyst and metal to be polymerized, temperature, and other conditions. The time of reaction is shortened by the use of higher temperature, higher concentrations of material to be polymerized, and higher amounts of catalyst. At low temperatures, say at room temperature or below, the time required to effect a given degree of polymerization is frequently unduly great for economy. However, the lower temperatures are preferred under certain circumstances as where aluminum chloride is used as the catalyst, because of the reduced tendency to form complexes with the rosin or rosin ester or with polymerized rosin or rosin ester.

Following the treatment, the reaction mixture is treated in any suitable manner to remove free metal chloride, combined metal chloride, and inorganic constituents therefrom. This may be accomplished to some extent by washing the reaction solution with water. If desired, the solution, following water washing, may be filtered through an absorbent such as "Filter-Cel" to remove small amounts of dispersed catalyst. It is preferred to wash with a dilute aqueous mineral acid such as hydrochloric, sulfuric, nitric, etc. Washing with such acid may be conducted either at room temperature or at an elevated temperature. The purpose of washing is to remove residual catalyst from the solution of polymer. Preferably, the washing with dilute acid is conducted by warming the reaction mixture with the dilute acid such as for example with 10-12% hydrochloric acid, followed by washing with water to remove water-soluble compounds. An inert solvent may be added during the warming period, to compensate for a small loss of ester solvent because of hydrolysis. Hydrolysis products of the ester solvent, for instance alcohol and acid, may be recovered by distillation.

If desired, the reaction solution may be washed with water, the solvent evaporated, the residue redissolved in an inert unhydrolyzable solvent such as for example, benzene, and the resulting solution refluxed with dilute mineral acid such as for example, 10-12% HCl, $H_2SO_4$, etc., followed by washing with water until water-soluble compounds are removed. In this way, any tendency towards hydrolysis of the ethyl acetate or similar reaction solvent by the refluxing with mineral acid such as hydrochloric acid, with contamination of the polymer with acetic acid or the like, is avoided. Again, if desired, the solution following water washing, may be passed through an absorbent such as "Filter-Cel" in order to remove traces of catalyst.

The washed solution, from which the metal chloride, and preferably the inorganic ash, have been substantially removed, may then be evaporated as for example under reduced pressure to remove the ethyl acetate or other solvent present in the final solution and to leave the polymerized rosin or rosin ester as a residue.

If desired, the polymerized product may be distilled under reduced pressure down to about 1 mm. of mercury at a temperature of from about 220° C. to about 300° C., in order to remove any unpolymerized rosin or rosin ester, or any rosin oil which may be present. In this way, the melting point of the product can be still further increased.

The product of the invention is characterized by a melting point increase of from about 5° C.

to about 50° C. over the melting point of the original material. The polymerization of rosin by the present invention considerably decreases its unsaturation but generally does not markedly effect its acid number. In some cases, the acid number of rosin is reduced to from about 10% to about 30% or more. The polymeric product will generally have a somewhat darker color than the raw material. If desired, the polymer may be treated in any suitable manner as for example, by means of selective solvents such as furfural, phenol, etc. or selective absorbents, such as fullers' earth, activated clay, activated carbon, etc. to remove color bodies and traces of catalyst therefrom.

Below are given several specific examples of illustrated methods of carrying out the process of the present invention.

Example 1

Twenty-five grams of anhydrous aluminum chloride was added to a solution of 250 grams K wood rosin in 465 grams ethyl acetate. The catalyst dissolved. The mixture was refluxed at atmospheric pressure (80° C.) for 48 hours, a calcium chloride drying tube being attached at the top of the condenser. Some HCl was evolved. The solution was water-washed with five 1000 cc. portions of water at 25° C. The solvent was evaporated by distillation in vacuo leaving a gel-like product. This product which upon cooling was in the form of a solid foam was redissolved in 300 cc. of benzene. The benzene solution was refluxed for 24 hours with 1000 cc. of aqueous 12% HCl, washed with five 1000 cc. portions of water, and the solvent removed by vacuo distillation. The product had an acid number of 162, drop melting point of 83° C., color D, and ash content 0.03%.

Example 2

This example was conducted in exactly the same manner as that of Example 1, except that the refluxing with dilute aqueous HCl was omitted prior to the water washing of the benzene solution. The product had an acid number of 64, indicating that a considerable amount of aluminum was combined with the polymerized rosin. The product was opaque and upon heating became gel-like. The color was F–. The ash content was 7.4%, further indicating the substantial content of residual aluminum.

Example 3

Twenty-five grams anhydrous aluminum chloride was added to a solution of 250 grams K wood rosin in 465 grams ethyl acetate. The solution was maintained at 25° C. for 48 hours. The reaction mixture was water washed with five 1000 cc. portions of water at 25° C. The solution was then evaporated to yield an opaque resin. The product had an acid number of 151, a drop melting point of 91° C., a color of D, and an ash content of 0.9.

Example 4

The product of Example 3 was redissolved in 600 g. benzene, and the solution refluxed for 24 hours with 1200 cc. of aqueous 12% HCl, then washed with five 1000 cc. portions of water, and the solvent evaporated to recover the polymer. This product had an acid number of 155, a drop melting point of 87.5° C., a color of D+, and an ash content of 0.37.

Example 5

To a solution of 200 g. ester gum in 400 g. ethyl acetate, was added 15 g. anhydrous SnCl$_4$ with cooling and agitation during 5 minutes at 10° C. The reaction mixture was allowed to stand for a period of 24 hours at 25–30° C. The solution was water washed and filtered through Filter-Cel to remove dispersed catalyst. The solvent was removed by vacuo distillation, using a final bath temperature of 220° C., and pressure of 20 mm.

|  | Original ester gum | Polymerized ester gum |
| --- | --- | --- |
| Acid number | 9 | 10 |
| Drop melting point, °C | 93 | 110 |
| Color | N | I |

Removal of traces of catalyst-polymer complex is difficult. This may be accomplished, however, by redissolving the product in an inert solvent such as benzene and washing or refluxing the solution with aqueous inorganic acids, as in Examples 1 and 4.

Example 6

To a solution of 200 g. methyl abietate in 400 g. ethyl acetate was added 25 g. anhydrous AlCl$_3$ with stirring at 10° C. The reaction mixture was allowed to stand for about 200 hours at 25–30° C., then water washed to remove catalyst, and filtered through Filter-Cel as previously. Solvent was removed as before.

|  | Original methyl abietate | Polymerized methyl abietate |
| --- | --- | --- |
| Acid number | 3 | 2 |
| Drop melting point, °C | (Viscous liquid) | 50 |
| (SCN)$_2$ | 85 | 60 |
| Color | WW | G |

As previously, traces of polymer-catalyst complex may be decomposed by washing or refluxing with aqueous acids.

Example 7

Same as Example 6 except that the reaction mixture was heated to 80° C. for a period of 24 hours.

|  | Original methyl abietate | Polymerized methyl abietate |
| --- | --- | --- |
| Acid number | 3 | 4 |
| Drop melting point, °C | (Viscous liquid) | 45 |
| Color | WW | G |

Example 8

To a solution of 150 g. of ester gum in 300 g. amyl butyrate was added 10 g. anhydrous SnCl$_4$ with cooling and agitation during 10 minutes at 15° C. The reaction mixture was allowed to stand for 24 hours at 25–30° C. The solution was water washed and filtered through Filter-Cel to remove dispersed catalyst. Solvent was removed by vacuo distillation using a final bath temperature of 220° C. and a pressure of 20 mm.

|  | Original ester gum | Polymerized ester gum |
| --- | --- | --- |
| Acid number | 9 | 12 |
| Drop melting point, °C | 93 | 108 |
| Color | N | H |

As previously stated, removal of traces of catalyst-polymer complex is difficult. This may be accomplished however by redissolving the product in an inert solvent such as benzene, etc., and washing or refluxing the solution with aqueous inorganic acids as in Examples 1 and 4.

From the foregoing, it will be seen that the polymerization of rosin and rosin esters with a metal chloride of an amphoteric metal in solution in ethyl acetate or the like brings about advantageous results over prior methods of polymerizing rosin and the like with metal chlorides. Numerous other advantages of the process of the present invention will be apparent to those skilled in the art.

It will be understood that the details and examples hereinbefore set forth are illustrative only and that the invention as broadly described and claimed is in no way limited thereby.

What I claim and desire to protect by Letters Patent is:

1. The process of polymerizing a material selected from the group consisting of rosin and rosin esters which comprises forming a solution of said material and a chlorirde of a metal capable of forming an amphoteric hydroxide in an organic solvent having the general formula

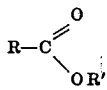

where R is an alkyl group of from 1 to 3 carbon atoms, and where R' is an alkyl group of from 1 to 8 carbon atoms, maintaining the solution under substantially anhydrous conditions and under polymerizing conditions at a temperature of from about −10° C. to about 150° C. for a period of time sufficient to effect substantial polymerization of said material, and recovering polymerized material from said solution.

2. The process of polymerizing a material selected from the group consisting of rosin and rosin esters which comprises forming a solution of said material and a chloride of a metal capable of forming an amphoteric hydroxide, in ethyl acetate, maintaining the solution under substantially anhydrous conditions at a temperature of from about −10° C. to about 150° C. for a period of time sufficient to effect substantial polymerization of said material, and recovering polymerized material from the reaction mixture.

3. The process of polymerizing a material selected from the group consisting of rosin and rosin esters which comprises forming a solution of said material and a chloride of a metal capable of forming an amphoteric hydroxide, in ethyl acetate, said solution containing said material in an amount which would yield with said ethyl acetate a concentration of from about 10% to about 70% of said material based on the combined weight of said material and said ethyl acetate, said solution containing said chloride in an amount ranging from about 1% to about 50% based on the weight of said material, maintaining the solution under substantially anhydrous conditions at a temperature of from about −10° C. to about 150° C. for a period of time ranging from about 3 to about 150 hours, and recovering polymerized material from the reacted mixture.

4. The process of polymerizing a rosin ester having an acid number not over about 25 which comprises forming a solution of said ester and aluminum chloride in ethyl acetate, maintaining the solution under substantially anhydrous conditions at a temperature of from about −10° C. to about 150° C. for a period of time sufficient to effect substantial polymerization of the rosin, and recovering polymerized rosin from the reaction product by refluxing a volatile organic solution thereof with dilute aqueous mineral acid followed by washing said organic solution with water and evaporating solvent from said washed organic solution to leave a residue of the polymerized material.

5. The process of polymerizing rosin which comprises forming a solution of rosin and aluminum chloride in ethyl acetate, maintaining the solution under substantially anhydrous conditions at a temperature of from about −10° C. to about 150° C. for a period of time sufficient to effect substantial polymerization of the rosin and recovering the polymerized rosin from the reaction product by refluxing a volatile organic solution thereof with dilute aqueous mineral acid followed by washing said organic solution with water and evaporating solvent from said washed organic solution to leave a residue of the polymerized material.

6. The process of polymerizing a gylcerine ester of rosin having an acid number not over about 25 which comprises forming a solution of said ester and aluminum chloride in ethyl acetate, maintaining the solution under substantially anhydrous conditions at a temperature of from about −10° C. to about 150° C. for a period of time sufficient to effect substantial polymerization of the rosin, and recovering polymerized rosin from the reaction product by refluxing a volatile organic solution thereof with dilute aqueous mineral acid followed by washing said organic solution with water and evaporating solvent from said washed organic solution to leave a residue of the polymerized material.

7. The process of polymerizing a material selected from the group consisting of rosin and rosin esters which comprises forming a solution of said material and a chloride of a metal capable of forming an amphoteric hydroxide in an organic solvent having the general formula

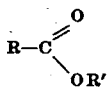

where R is an alkyl group of from 1 to 3 carbon atoms, and where R' is an alkyl group of from 1 to 8 carbon atoms, maintaining the solution under polymerizing conditions at a temperature of from about −10° C. to about 150° C. for a sufficient period of time to substantially polymerize said material, washing the solution with water, evaporating said solvent therefrom, redissolving the product in a solvent incapable of hydrolysis, refluxing the thus formed solution with dilute aqueous mineral acid, washing the refluxed mixture with water, and evaporating the solvent from the washed solution to recover the polymerized material.

8. The process which comprises forming a solution of a material selected from the group consisting of rosin and rosin esters and of a chloride of a metal capable of forming an amphoteric hydroxide in an organic solvent having the general formula

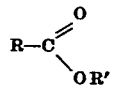

where R is an alkyl group of from 1 to 3 carbon atoms, and where R' is an alkyl group of from 1 to 8 carbon atoms, maintaining the solution under polymerizing conditions at a temperature of about −10° C. to about 150° C. for a sufficient period of time to substantially polymerize said material, washing a solution of the reaction product with water, filtering the water washed solution through an absorbent to remove small amounts of catalyst therefrom, and evaporating the filtered solution to recover the polymerized material.

9. The process of polymerizing a material selected from the group consisting of rosin and rosin esters which comprises forming a solution of said material and a chloride of a metal capable of forming an amphoteric hydroxide, in butyl acetate, maintaining the solution under substantially anhydrous conditions at a temperature of from about —10° C. to about 150° C. for a period of time sufficient to effect substantial polymerization of said material, and recovering polymerized material from the reaction mixture.

10. The process of polymerizing rosin which comprises forming a solution of rosin and aluminum chloride in butyl acetate, maintaining the solution under substantially anhydrous conditions at a temperature of from about —10° C. to about 150° C. for a period of time sufficient to effect substantial polymerization of the rosin and recovering the polymerized rosin from the reaction product by refluxing a volatile organic solution thereof with dilute aqueous mineral acid followed by washing said organic solution with water and evaporating solvent from said washed organic solution to leave a residue of the polymerized material.

JOSEPH N. BORGLIN.